United States Patent
Grenier

Patent Number: 6,166,660
Date of Patent: Dec. 26, 2000

[54] DRIVEWAY ALARM SYSTEM

[76] Inventor: Frank Grenier, 57 Green Hill Rd., Middlebury, Conn. 06762

[21] Appl. No.: 09/396,064

[22] Filed: Sep. 15, 1999

[51] Int. Cl.⁷ ................................................. B60Q 1/48
[52] U.S. Cl. ...................... 340/932.2; 340/941; 340/933; 340/515; 340/934; 340/935
[58] Field of Search ................................ 340/932.2, 933, 340/941, 551, 435, 569

[56] References Cited

U.S. PATENT DOCUMENTS

| | | |
|---|---|---|
| 2,588,879 | 3/1952 | Richards . |
| 3,745,450 | 1/1973 | Wilt ............................................. 324/41 |
| 4,232,285 | 11/1980 | Nabaits-Jaureguy et al. . |
| 4,392,119 | 1/1983 | Price et al. ............................. 340/38 L |
| 4,523,193 | 6/1985 | Levinson et al. . |
| 5,023,595 | 6/1991 | Bennett .................................... 340/596 |
| 5,057,831 | 10/1991 | Strang et al. ............................ 340/941 |
| 5,323,151 | 6/1994 | Parsadayan ............................. 340/933 |
| 5,604,478 | 2/1997 | Grady et al. . |
| 5,748,074 | 5/1998 | Chomet . |
| 5,850,192 | 12/1998 | Turk et al. .............................. 340/933 |
| 5,954,264 | 9/1999 | Keller ....................................... 232/17 |

*Primary Examiner*—Daniel J. Wu
*Assistant Examiner*—Hung Nguyen
*Attorney, Agent, or Firm*—Ware, Fressola, Van Der Sluys & Adolphson LLP

[57] ABSTRACT

A driveway alarm system for disposing along a driveway of a home or business for warning an occupant of the premise about an object, including a vehicle, on the driveway, or for warning a driver of a vehicle about an overhanging object in the driveway. The overhead warning and driveway alarm system includes a solar panel, a battery, a magnetic field generator, a driveway probe and a transmitter. The solar panel charges the battery which powers the driveway probe and the transmitter. The driveway probe creates a magnetic field. When the magnetic field is disturbed, the transmitter is activated, sending a radio signal to the receiver. In operation, when a car or other object disturbs the magnetic field proximate the driveway probe sensor, the transmitter provides a radio alert signal to the indoor subsystem. The overhead warning and driveway alarm system also includes a radio signal receiver, a line carrier current transformer, and line carrier current triggered audio devices such as chiming loudspeakers which are powered by standard 110 volt household AC outlets. The receiver activates the line carrier current transformer causing all audio devices plugged into 110 volt outlets to emit a chime sound for warning the occupant of a premise about the object on the driveway, or for warning the driver of the vehicle about the overhanging object in the driveway.

3 Claims, 1 Drawing Sheet

DRIVEWAY ALARM SYSTEM

BACKGROUND OF INVENTION

1. Technical Field

The present invention relates to a sensing and warning device for a driveway; and more particularly, relates to a combination solar, and battery powered, electromagnetic driveway sensing and warning device that alerts the occupant inside the premises to the presence of driveway traffic via a radio signal that triggers an audio chime located within the premises, or for warning a driver of a vehicle about an overhanging object in the driveway.

2. Description of Related Art

A patentability search was conducted and many different patents were found.

U.S. Pat. No. 2,588,879 discloses an automatic garage door opening system that includes a loop of wire on a driveway or slightly buried in a position to inductively couple with an antenna loop in an automobile. The automatic garage door opener is actuated by sensors located on the driveway, so that when a car fitted with a complementary device pulls up to the garage door, the door automatically opens for only that particular car.

U.S. Pat. No. 4,232,285 discloses an electromagnetic detector designed to monitor vehicle road traffic, having a transmitting coil means and a receiving coil spaced therefrom over a metal base. When a vehicle passes over the metal base, a disturbance in an induced field is detected. In operation, the electromagnetic detector is located on a road responsive to a modification of a magnetic field in a system for the monitoring of road traffic.

U.S. Pat. Nos. 4,523,193 and 5,748,074 disclose remote controlled doorbell systems that include a radio signal transmitter coupled with a doorbell and a radio signal receiver that produces a signal to activate a tone generator. The remote controlled doorbell systems may have several receivers located throughout the residence.

U.S. Pat. No. 5,023,595 discloses a mail arrival system that uses a solar powered radio frequency transmitter attached to the mailbox and actuated by opening a mailbox door. Solar cells are shown on a transmitter housing. A receiver located in a residence produces an audible musical tune.

U.S. Pat. No. 5,604,478 discloses a pet operable door chime system that includes a switch unit with a radio frequency transmitter operated by a pet placing a paw on the upper surface, and a receiver designed to produce a chime when the radio signals are received.

SUMMARY OF INVENTION

The present invention provides a driveway alarm system for disposing along a driveway of a premise, such as a home or business, for warning an occupant of the premise about an object, including a vehicle, on the driveway, or for warning a driver of a vehicle about an overhanging object in the driveway. The driveway alarm system includes a solar panel, a battery, a magnetic field generator, a driveway probe and a transmitter. The solar panel charges the battery which powers the driveway probe and the transmitter. The driveway probe creates a magnetic field. When the magnetic field is disturbed, the transmitter is activated sending a radio signal to the receiver. The magnetic field is directionally orientated in a desired area of the driveway. In operation, when a car or other object disturbs the magnetic field proximate the driveway probe sensor, the transmitter provides a radio alert signal to the indoor subsystem. The overhead warning and driveway alarm system also includes a radio signal receiver, a line carrier current transformer, and line carrier current triggered audio devices such as chiming loudspeakers which are powered by standard 110 volt household AC outlets. The receiver activates the line carrier current transformer causing all audio devices plugged into 110 volt outlets to emit a chime sound for warning the occupant of the premise about the object on the driveway, or for warning the driver of the vehicle about the overhanging object in the driveway.

The driveway alarm system includes indoor and outdoor subsystems. The outdoor subsystem includes the solar panel, the battery, the magnetic field generator, the driveway probe and the transmitter. The solar panel charges the battery which powers the driveway probe and the transmitter. The indoor subsystem comprises the radio signal receiver, the line carrier current transformer, and the plurality of line carrier current triggered audio devices such as chiming loudspeakers which are powered by standard 110 volt household AC outlets. The receiver activates the line carrier current transformer causing all audio devices plugged into 110 volt outlets to emit a chime sound. In operation, when the alert radio signal from the transmitter is received by the receiver, it is converted into a line current sufficient to trigger the audio devices to alert the occupant of the premises that something, usually a vehicle, has entered the driveway.

In accordance with the present invention, when a car or other object enters the driveway of the premise, an alert signal is sent to the occupant of the premise. Typically, the signal is an audio chime which propagates from a section of the present invention which is located in a convenient spot within the premise. The invention is composed generally of two sections, an outdoor section, and an indoor section, which are linked by a radio wave signal via a transmitter and receiver. The outdoor section is situated either unobtrusively on top of the driveway, or partly within the driveway, depending upon the installation.

One advantage of the present invention is that it provides a low maintenance, solar powered, self-charging, outdoor electromagnetic driveway sensing device and transmitter which is easy to install, weatherproof, inexpensive to manufacture, and which is part of an easy to install and use total system which includes an indoor alerting unit. The battery and solar power eliminate the need for a power line running along the driveway.

BRIEF DESCRIPTION OF THE DRAWING

For a fuller understanding of the nature of the invention, reference should be made to the following detailed descriptions taken in connection with the accompanying drawing, not in scale, in which.

DETAILED DESCRIPTION OF THE INVENTION

Figure 1:
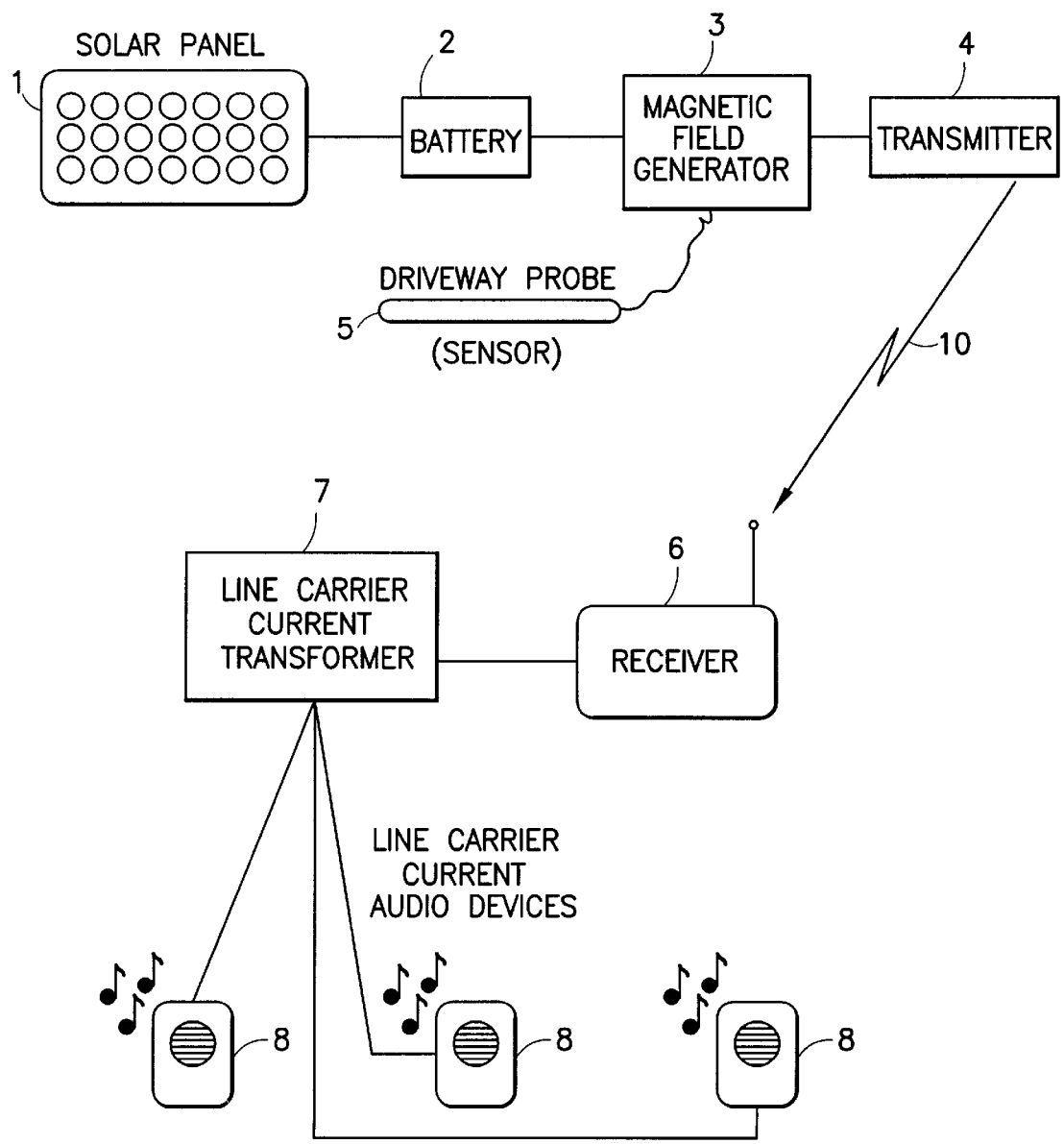
FIG. 1 is a block diagram showing the arrangement of components in accordance with the principles of the present invention.

FIG. 1 shows a block diagram of a driveway alarm system either for warning an occupant of a premise about an object, including a vehicle, on the driveway, or for warning a driver of a vehicle about an overhanging object in the driveway.

The driveway alarm system includes an outdoor subsystem having a solar panel 1, a battery 2, a magnetic field generator 3, a transmitter 4 and a driveway sensor probe 5. The overhead warning and driveway alarm system also includes an indoor subsystem having a receiver 6, a line carrier current transformer 7, line carrier current audio devices 8 connected to standard household 110 volt AC outlets AC. Radio alert signal 10 from the transmitter 4 to the receiver 6 is also shown.

In operation, the solar panel 1 responds to sunlight, for providing a solar panel signal. The battery 2 responds to the solar panel signal for providing a battery signal. The driveway probe 5 responds to a magnetic field signal, for providing a magnetic field, and further responds to the object (not shown) on the driveway (not shown), for providing a driveway probe signal containing information about the magnetic field that has been disturbed by the object on the driveway. If multiple probes are used, then the information may include a location of the vehicle on the driveway, which could enable the system to provide a different audio or visual indication depending on the location. The scope of the information is not intended to be limited to the type of information contained in the driveway probe signal. The magnetic field generator 3 responds to the battery signal, for providing the magnetic field signal, and further responsive to the driveway probe signal, for providing a magnetic field generator signal indicating that the magnetic field has been disturbed. The radio transmitter responds to the magnetic field generator signal, for providing a radio transmitter signal. The radio transmitter receives power from the battery signal directly or through the magnetic field generator signal, as shown. The receiver 6 responds to the radio transmitter signal, for providing a receiver signal. The line carrier current transformer 7 responds to the receiver signal, for providing a line carrier current transformer signal. The line carrier current audio device 8, responds to the line carrier current transformer signal, for providing a line carrier current audio device signal for warning an occupant of a premise about the object on the driveway or for warning a driver of the vehicle about an overhanging object in the driveway.

As shown, the sensor probe 5 is the only outdoor component required to be located on the driveway. The other outdoor components may be hidden out of view, though the solar panel 1 requires clear access to sunlight.

In operation, the outdoor subsystem includes the solar panel 1, the battery 2, the magnetic field generator 3, the transmitter 4, and the driveway probe connected to the magnetic field generator 3 for directionally orientating the magnetic field in relation to the desired area of the driveway. When a car or other object disturbs the magnetic field proximate the driveway probe sensor 5, the transmitter 4 transmits a radio alert signal 10 to receiver 8 of the indoor section of the present invention. The solar panel 1, the battery 2, the magnetic field generator 3, the transmitter 4, and the driveway probe 5 are known in the art, and the scope of the invention is not intended to be limited to any particular type thereof. Moreover, the scope of the invention is not intended to be limited to the manner of sensing the car or other object on the driveway. For example, embodiments are also envisioned in which an optical detector or pressure sensor is used for sensing the car or other object on the driveway.

The indoor subsystem includes the radio signal receiver 6, the line carrier current transformer 7, and the line carrier current triggered audio devices 8 such as chiming loudspeakers which are powered by standard 110 volt household AC outlets. When the alert radio signal 10 from the transmitter 4 is received by the receiver 6, it is converted into a line current by the line carrier current transformer 7 sufficient to trigger the audio devices to alert the occupant of the premises that something, usually a vehicle, has entered the driveway. The radio signal receiver 6, the line carrier current transformer 7, and the line carrier current triggered audio devices 8 are known in the art, and the scope of the invention is not intended to be limited to any particular type thereof. The scope of the invention is not intended to be limited to only audio chimes. Embodiments are envisioned using other types of audio signals, visual signals, or a combination thereof to alert the occupant of the premises that something, usually a vehicle, has entered the driveway.

The battery 2 is preferably rechargeable, and the solar panel 1 charges and recharges the battery 2 of the outdoor subsystem. The uses of battery and solar power eliminates the need for running AC electrical wires, so the outdoor subsystem requires no hardwiring to the premises. The outdoor subsystem is easy to install on the driveway, and does not require burial beneath the driveway or extensive reworking of the driveway. The outdoor subsystem is weatherproof and requires little maintenance.

The scope of the invention is not intended to be limited to only a driveway probe system. Embodiments are envisioned wherein the system of the present invention is used in an overhead warning system for providing information to vehicles to beware of low overhanging signs, walls of buildings, etc, for example, that is commonly found at drive-in windows of fast food restaurants.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A driveway alarm system either for warning an occupant of a premise about an object, including a vehicle, on the driveway, or for warning a driver of a vehicle in the driveway, comprising:

a solar panel, responsive to sunlight, for providing a solar panel signal;

a battery, responsive to the solar panel signal for providing a battery signal;

a driveway probe, responsive to a magnetic field signal, for providing a magnetic field, and further responsive an object on a driveway, for providing a driveway probe signal containing information about a magnetic field that has been disturbed by the object on the driveway;

a magnetic field generator, responsive to the battery signal, for providing the magnetic field signal, and further responsive to the driveway probe signal, for providing a magnetic field generator signal indicating that the magnetic field has been disturbed;

a radio transmitter, responsive to a magnetic field generator signal, for providing a radio transmitter signal;

a receiver, responsive to the radio transmitter signal, for providing a receiver signal;

a line carrier current transformer, responsive to the receiver signal, for providing a line carrier current transformer signal; and a line carrier current audio device, responsive to the line carrier current transformer signal, for providing a line carrier current audio device signal for warning an occupant of the premise about the vehicle in the driveway.

2. A driveway alarm system for warning a driver of a vehicle in a driveway, comprising:

a solar panel, responsive to sunlight, for providing a solar panel signal;

a battery, responsive to the solar panel signal, for providing a battery signal;

a driveway probe, responsive to a magnetic field signal, for providing a magnetic field, and further responsive to an object on a driveway, for providing a driveway probe signal containing information about a vehicle in the driveway;

a magnetic field generator, responsive to the battery signal, for providing the magnetic field signal, and further responsive to the driveway probe signal, for providing a magnetic field generator signal;

a radio transmitter, responsive to a magnetic field generator signal, for providing a radio transmitter signal;

a receiver, responsive to the radio transmitter signal, for providing a receiver signal;

a line carrier current transformer, responsive to the receiver signal, for providing a line carrier current transformer signal; and a line carrier current audio device, responsive to the line carrier current transformer signal, for providing a line carrier current audio or visual device signal for warning an occupant of a premise in the driveway.

3. A driveway alarm system for warning an occupant of a premise about an object, including a vehicle, on the driveway, comprising:

a solar panel, responsive to sunlight, for providing a solar panel signal;

a battery, responsive to the solar panel signal for providing a battery signal;

a driveway probe, responsive to a magnetic field signal, for providing a magnetic field, and further responsive an object on a driveway, for providing a driveway probe signal containing information about a magnetic field that has been disturbed by the object on the driveway;

a magnetic field generator, responsive to the battery signal, for providing the magnetic field signal, and further responsive to the driveway probe signal, for providing a magnetic field generator signal indicating that the magnetic field has been disturbed;

a radio transmitter, responsive to a magnetic field generator signal, for providing a radio transmitter signal;

a receiver, responsive to the radio transmitter signal, for providing a receiver signal;

a line carrier current transformer, responsive to the receiver signal, for providing a line carrier current transformer signal; and a line carrier current audio device, responsive to the line carrier current transformer signal, for providing a line carrier current audio device signal for warning an occupant of the premise about the object on the driveway.

* * * * *

UNITED STATES PATENT AND TRADEMARK OFFICE
CERTIFICATE OF CORRECTION

PATENT NO. : 6,166,660
DATED : December 26, 2000
INVENTOR(S) : Grenier

It is certified that error appears in the above-identified patent and that said Letters Patent is hereby corrected as shown below:

Title page,
Item [56] References Cited, please delete "3,745,450 1/1973 Wilt" and insert -- 3,745,450 7/1973 Wilt --;

delete "4,392,119 1/1983 Price et al." and insert -- 4,392,119 7/1983 Price et al.--

ABSTRACT
Item [57],
Line 6, please delete "The overhead warning and driveway alarm," and insert -- The driveway alarm --.

Signed and Sealed this

Sixth Day of November, 2001

Attest:

NICHOLAS P. GODICI
Attesting Officer   Acting Director of the United States Patent and Trademark Office